United States Patent [19]

Higashihara et al.

[11] Patent Number: 5,061,953
[45] Date of Patent: Oct. 29, 1991

[54] FOCUS ADJUSTING APPARATUS FOR USE IN A CAMERA ON THE LIKE

[75] Inventors: Masaki Higashihara, Yokohama; Ichiro Ohnuki, Kawasaki; Akira Akashi; Terutake Kadohara, both of Yokohama, all of Japan

[73] Assignee: Canon Kabushiki Kaisha, Tokyo, Japan

[21] Appl. No.: 639,420

[22] Filed: Jan. 10, 1991

Related U.S. Application Data

[63] Continuation of Ser. No. 288,580, Dec. 22, 1988, abandoned.

[30] Foreign Application Priority Data

Dec. 24, 1987 [JP] Japan .................. 62-328233

[51] Int. Cl.$^5$ .................. G03B 13/36; G03B 7/28
[52] U.S. Cl. .................. 354/402; 250/201.2
[58] Field of Search .................. 354/400, 402; 250/201.2–201.8

[56] References Cited

U.S. PATENT DOCUMENTS 4,681,419 7/1987 Sakai et al. .................. 354/402
4,709,138 11/1987 Suda et al. .................. 354/402
4,783,677 11/1988 Hamada et al. .................. 354/402
4,800,261 1/1989 Akashi .................. 354/402

FOREIGN PATENT DOCUMENTS 62-125311 6/1987 Japan .
62-139511 6/1987 Japan .
62-139512 6/1987 Japan .

Primary Examiner—W. B. Perkey
Attorney, Agent, or Firm—Fitzpatrick, Cella, Harper & Scinto

[57] ABSTRACT

A focus adjusting apparatus in which a lens position in focus to an object at a predetermined time is foreseen with the result of the distance measurement at a plurality of times in the past taken into account, and a lens is driven to the foreseen position to thereby make the lens always in focus to a moving object. Whether the distance measurement is being continuously effected for the same object is discriminated based on the continuity of movement of the moving object and when the distance measurement for the same object is not effected, the foreseeing operation is inhibited and proper foreseeing operations are executed.

28 Claims, 10 Drawing Sheets

FOCUS ADJUSTING APPARATUS FOR USE IN A CAMERA ON THE LIKE

This application is a continuation of application Ser. No. 288,580, filed Dec. 22, 1988, now abandoned.

BACKGROUND OF THE INVENTION

1. Field of the Invention

This invention relates to an automatic focus adjusting apparatus for use in a camera or the like.

2. Related Background Art

Many of the automatic focus adjusting systems of single-lens reflex cameras intend to make the lens infocus to an object by repetitively effecting the cycle of "focus detection (sensor signal input and focus detection calculation) and lens driving". The amount of lens driving in each cycle is based on the defocus amount at the point of time whereat focus detection has been effected in the cycle, and this presumes that the defocus amount during focus detection is eliminated at the end of lens driving.

As a matter of course, focus detection and lens driving require a correspondingly long time, and in the case of a stationary object, the defocus amount does not vary unless the lens is driven and therefore, the defocus amount to be eliminated at the point of time whereat lens driving has been terminated is equal to the defocus amount at the point of time whereat focus detection has been effected, and proper focus adjustment is accomplished.

However, in the case of an object which is in motion, the defocus amount varies during focus detection and lens driving and said defocus amount to be eliminated sometimes differs remarkably from the detected defocus amount and as a result, this leads to the problem that at the end of lens driving, the lens is not in focus to the object.

An automatic focus adjusting method which intends to solve the above-noted problem is disclosed in Japanese Laid-Open Patent Applications Nos. 62-125311, 62-139511 and 62-139512.

The gist of the method disclosed in these publications is to foresee a variation in the defocus attributable to the movement of an object and exert correction on the amount of lens driving (hereinafter referred to as the pursuit correction) in view of the variation in the detected defocus in each said cycle and the time intervals between the cycles, and from the viewpoint of the focusing accuracy at the end of lens driving, an improvement in the above-noted problem is expected by the same method.

However, when said pursuit correction is actually effected, the following problem arises.

When the object in the distance measuring field shifts to another object when the object is being pursued in the pursuit correction mode, the continuity of the variation in the imaging plane position is lost and therefore, if foreseeing is effected with the aid of the data of the past object and the data of the new object, wrong foreseeing will be performed and as a result, the lens will be driven to an entirely different position.

Thus, when the object in the distance measuring field shifts to another object, wrong foreseeing is performed and this leads to the problem that the wrong foreseeing is not eliminated as long as foreseeing control is effected by the use of the data of the old object.

The operation of the above-described prior-art apparatus will hereinafter be described with reference to the accompanying drawings.

FIG. 2 is a graph for illustrating the lens driving correction method according to the prior art. In the figure, the horizontal axis represents time t, and the vertical axis represents the imaging plane position x of the object.

The solid-line curve x(t) represents the imaging plane position at time t of the object which comes near the camera in the direction of the optic axis when the photo-taking lens is at infinity. The broken line l(t) represents the position of the photo-taking lens at time t, and the infocus condition is brought about when x(t) and l(t) coincide with each other. $[t_i, t_i']$ represents the focus detecting operation, and $[t_i', t_{i+1}]$ represents the lens driving operation. Also, in the example of the prior art shown in FIG. 2, the assumption is made that the imaging plane position varies in accordance with a quadratic function. That is, if the current and past three imaging plane positions $(t_1, x_1)$, $(t_2, x_2)$ and $(t_3, x_3)$ are known, the imaging plane position $x_4$ at time $t_4$ in TL (AF timelag + release time-lag) after time $t_3$ can be foreseen on the basis of the equation $x(t) = at^2 + bt + c$.

However, what can be actually detected by the camera are not the imaging plane positions $x_1$, $x_2$ and $x_3$, but the defocus amounts $DF_1$, $DF_2$ and $DF_3$ and the amounts of lens driving $DL_1$ and $DL_2$ converted into the amounts of movement of the imaging plane. The time $t_4$ is a future value and actually, it is a value which varies with a variation in the accumulation time of an accumulation type sensor caused by the brightness of the object, but here, for simplicity, it is assumed as follows:

$$t_4 - t_3 = TL = TM_2 + \text{(release time-lag)} \quad (1)$$

Under the above assumption, the amount of lens driving $DL_3$ calculated from the result of the focus detection at time $t_3$ can be found as follows:

$$x(t) = at^2 + bt + C \quad (2)$$

If $(t_1, l_1)$ in FIG. 2 is considered to be the origin, $$t_1 = 0 \quad\quad x_1 = DF_1 \quad (3)$$
$$t_2 = TM1 \quad\quad x_2 = DF_2 + DL_1 \quad (4)$$
$$t_3 = TM1 + TM2 \quad\quad x_3 = DF_3 + DL_1 + DL_2 \quad (5)$$

If the equations (3), (4) and (5) are substituted into the equation (2) to find a, b and c, $$a = \frac{DF_3 + DL_2 - DF_2}{(TM1 + TM2) \cdot TM2} + \frac{DF_1 - DL_1 - DF_2}{(TM1 + TM2) \cdot TM1} \quad (6)$$

$$b = \frac{DF_2 + DL_1 - DF_1 - a \cdot TM1^2}{TM1} \quad (7)$$

$$c = DF_1 \quad (8)$$

Consequently, the amount of lens driving $DL_3$ converted into the amount of movement of the imaging plane at time $t_4$ can be found as follows:

$$
\begin{aligned}
DL_3 &= x_4 - l_3 \quad (9)\\
&= x_4 - x_3 + DF_3\\
&= a\{(TM1 + TM2 + TL)^2 - (TM1 + TM2)^2\} +\\
&\quad b \cdot TL + DF_3
\end{aligned}
$$

A problem which arises when the object in the distance measuring field shifts to another object will now be described with reference to FIG. 3.

FIG. 3 shows the relation between time and the imaging plane position, and in this figure, the solid line represents the imaging plane position of a first object, and the dot-and-dash line represents the imaging plane position of a second object.

Here, let it be assumed that at times $t_1$ and $t_2$, focus detection is effected for the first object and the lens is driven and at time $t_3$, focus detection is effected for the second object.

Thereupon, on the camera side, the imaging plane positions $x_1$, $x_2$ and $x_3'$ at times $t_1$, $t_2$ and $t_3$ are calculated from the defocus amount and the amount of lens driving obtained by focus detection, and a quadratic function f(t) passing through $(t_1, x_1)$, $(t_2, x_2)$ and $(t_3, x_3')$ is calculated, and the imaging plane position $x_4''$ at time $t_4$ is foreseen by means of this f(t).

However, the imaging plane position of the first object at time $t_4$ is $x_4$ and the imaging plane position of the second object at time $t_4$ is $x_4'$, and $x_4''$ obtained by foreseeing is a position differing from the imaging plane positions of both of the objects.

Thus, to foresee the imaging plane position $x_4$ of the first object, it is necessary to find a function passing through $(t_1, x_1)$, $(t_2, x_2)$ and $(t_3, x_3)$, and to foresee the imaging plane position $x_4'$ of the second object, it is necessary to find a function passing through $(t_1, x_1')$, $(t_2, x_2')$ and $(t_3, x_3')$.

On the camera side, however, the first object and the second object cannot be distinguished from each other and therefore, foreseeing calculation is effected by the use of the defocus amount obtained by focus detection at time $t_3$. As a result, the foreseeing function is neither an approximate function of the imaging plane position of the first object nor an approximate function of the second object, and the foreseen lens driving position becomes wrong. This is a problem which will arise certainly if the main object is switched to the second object while the photographer is pursuing the first object, because the wrong foreseeing as described above takes place if the data of the focus detection effected for any other object than the main object is present in the data used for foreseeing.

SUMMARY OF THE INVENTION

One aspect of the invention is to provide a focus adjusting apparatus which discriminates whether the object being distance-measured is the same object and thereby discriminates whether it is in a state suited for foreseeing control.

One aspect of the invention is to provide a focus adjusting apparatus which, under the above object, effects a focus adjustment using foreseeing control when in a state suited for foreseeing control.

One aspect of the invention is to provide a focus adjusting apparatus which discriminates by a variation in the imaging plane position, a variation in the foreseeing function, an image signal, etc. whether the object is the same as the last one, and resets data used for foreseeing if it is judged that the object has shifted to another object, and again effects the accumulation of the data necessary for foreseeing, and then effects foreseeing control, whereby the photographer can immediately pursue a new object without effecting improper foreseeing even if the photographer changes the object in the course of photographing.

Other objects of the invention will become apparent from the following detailed description thereof taken in conjunction with the accompanying drawings.

DESCRIPTION OF THE PREFERRED EMBODIMENTS

Figure 4:
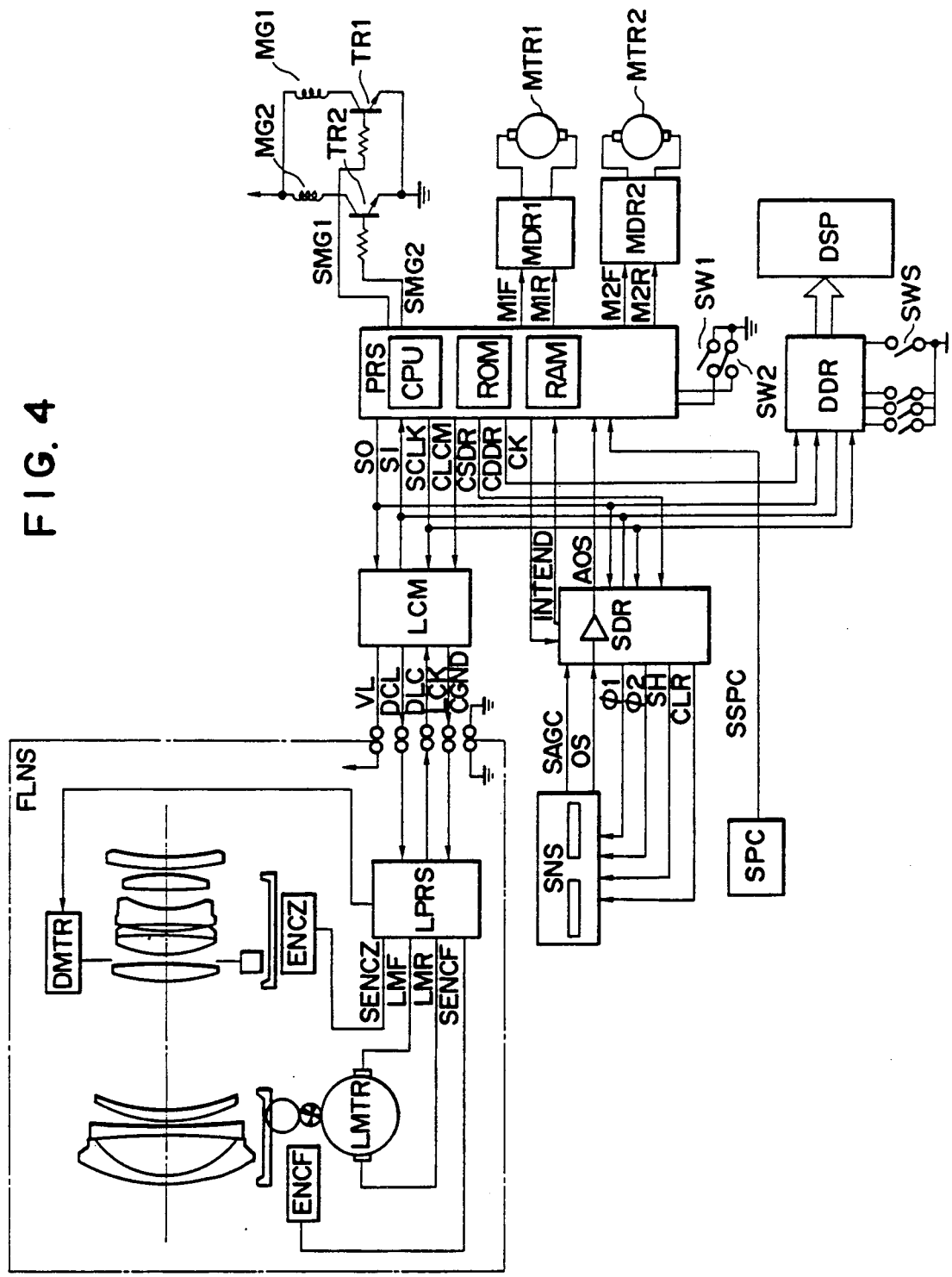
FIG. 4 is a circuit diagram of a camera which is an embodiment of the present invention and a lens.

FIG. 4 is a circuit diagram showing an embodiment of a camera provided with an auto focus apparatus according to the present invention.

In FIG. 4, PRS designates the control device of the camera which is, for example, a one-chip microcomputer having a CPU (central processing unit), a ROM, an RAM and a A/D converter therein. The computer PRS performs a series of operations of the camera such as the automatic exposure control function, the automatic focus detecting function and film winding in accordance with the sequence program of the camera stored in the ROM. For that purpose, the computer PRS uses signals for synchronous communication SO, SI and SCLK and communication selection signals CLCM, CSDR and CDDR to communicate with the surrounding circuits and the lens in the camera body and control the operations of the respective circuits and the lens.

SO is a data signal output from the computer PRS, SI is a data signal input to the computer PRS, and SCLK is a synchronizing clock of the signals SO and SI.

LCM denotes a lens communication buffer circuit which supplies electric power to a power source terminal for the lens during the operation of the camera and provides a communication buffer between the camera and the lens when the selection signal CLCM from the computer PRS is at a high potential level (hereinafter referred to as "H").

That is, when the computer PRS renders CLCM into "H" and supplies predetermined data from SO in synchronism with SCLK, LCM outputs the buffer signals LCK and DCL of SCLK and SO to the lens through the contact between the camera and the lens. Simultaneously therewith, LCM outputs the buffer signal of signal DLC from the lens as SI, and the computer PRS inputs said SI as the data from the lens in synchronism with SCLK.

SDR designates a driving circuit for a focus detecting line sensor device SNS comprised of a CCD or the like. The driving circuit SDR is selected when signal CSDR is "H", and is controlled from PRS by the use of SO, SI and SCLK.

Signal CK is a clock for producing CCD driving clocks $\phi 1$ and $\phi 2$, and signal INTEND is a signal for informing PRS that the accumulating operation has been completed.

The output signal OS of SNS is a time-serial image signal synchronized with the clocks $\phi 1$ and $\phi 2$, and is amplified by an amplifier circuit in SDR, and thereafter is output as AOS to the computer PRS. The computer PRS inputs AOS from an analog input terminal, and A/D-converts it by the A/D converting function therein in synchronism with CK, and thereafter stores it at the predetermined address of the RAM.

SAGC which also is the output signal of the sensor device SNS is the output of the sensor for AGC (auto gain control) in the sensor device SNS, and is input to the driving circuit SDR and is used for the image signal accumulation control in the sensor device SNS.

SPC denotes a photometering sensor for exposure control which receives the light from an object passed through a photo-taking lens, and the output SSPC thereof is input to the analog input terminal of the computer PRS, and is A/D-converted, whereafter it is used for automatic exposure control (AE) in accordance with a predetermined program.

DDR designates a circuit for switch detection and display. The circuit DDR is selected when signal CDDR is "H", and is controlled from PRS by the use of SO, SI and SCLK. That is, it changes over the display on the display member DSP of the camera on the basis of the data supplied from PRS, or informs the computer PRS of the ON-OFF states of the various operating members of the camera by communication.

Switches SW1 and SW2 are switches operatively associated with a release button, not shown, and the switch SW1 is closed by the first-state depression of the release button, and the switch SW2 is closed by the second-stage depression of the release button. The computer PRS, as will be described later, performs photometry and auto focus adjusting operation upon the closing of the switch SW1, and performs exposure control and film winding with the closing of the switch SW2 as a trigger. The switch SW2 is connected to the "interruption input terminal" of the microcomputer PRS, an interruption is applied by the closing of the switch SW2 even when the program is being executed during the closing of the switch SW1, whereby a shift can be immediately made to a predetermined interruption program.

MTR1 denotes a film feeding motor, and MTR2 designates a motor for driving the mirror up and charging the down and shutter spring. Forward and reverse rotations of these motors are controlled by their respective driving circuits MDR1 and MDR2. Signals M1F, M1R, M2F and M2R input from PRS to MDR1 and MDR2 are signals for controlling the motors.

MG1 and MG2 denote magnets for starting the movement of the forward and rearward shutter curtains, respectively. These magnets are electrically energized by signals SMG1 and SMG2 and amplifying transistors TR1 and TR2, and shutter control is effected by PRS.

The circuit DDR for switch detection and display, the motor driving circuits MDR1 and MDR2 and shutter control have no direct relation with the present invention and therefore need not be described in detail.

Signal DCL input to a control circuit LPRS in the lens in synchronism with LCK is the command data from the camera to the lens FLNS, and the operation of the lens for the command is predetermined.

LPRS analyzes the command in accordance with a predetermined procedure, and effects the focus adjusting operation, the aperture control operation and the outputting of the various parameters of the lens (such as open F-number, focal length, and the coefficient of defocus amount VS. amount of axial movement) from the output DLC.

In the embodiment, there is shown an example of a zoom lens, and when a command for focus adjustment is sent from the camera, a focus adjusting motor LMTR is driven by signals LMF and LMR in accordance with the amount of driving and the direction of driving sent at the same time, whereby the optical system is moved in the direction of the optic axis to accomplish focus adjustment. The amount of movement of the optical system is monitored by the pulse signal SENCF of an encoder circuit ENCF and is counted by a counter in LPRS, and at a point of time whereat a predetermined movement has been completed, LPRS itself renders signals LMF and LMR into "L" and brakes the motor LMTR.

Therefore, once a command for focus adjustment has been supplied from the camera, the control device PRS in the camera need not at all be concerned with the lens driving until the lens driving is terminated.

Also, when a command for aperture control is supplied from the camera, a conventional stepping motor DMTR is driven for aperture driving in accordance with the number of aperture steps supplied at the same time. The stepping motor can be open-controlled and therefore does not require an encoder for monitoring the operation thereof.

ENCZ designates an encoder circuit attendant on a zoom optical system, and the control circuit LPRS in the lens receives as an input a signal SENCZ from the encoder circuit ENCZ and detects the zoom positions. The control circuit LPRS in the lens stores therein the lens parameter at each zoom position, and supplies a parameter corresponding to the current zoom position to the camera when there is a requirement from the computer PRS of the camera.

The operation of the camera constructed as described above will now be described with reference to the flow charts of FIGS. 5 and so on.

When a power source switch, not shown, is closed, supply of electric power to the microcomputer PRS is started and the computer PRS starts to execute the sequence program stored in the ROM.

Figure 5:
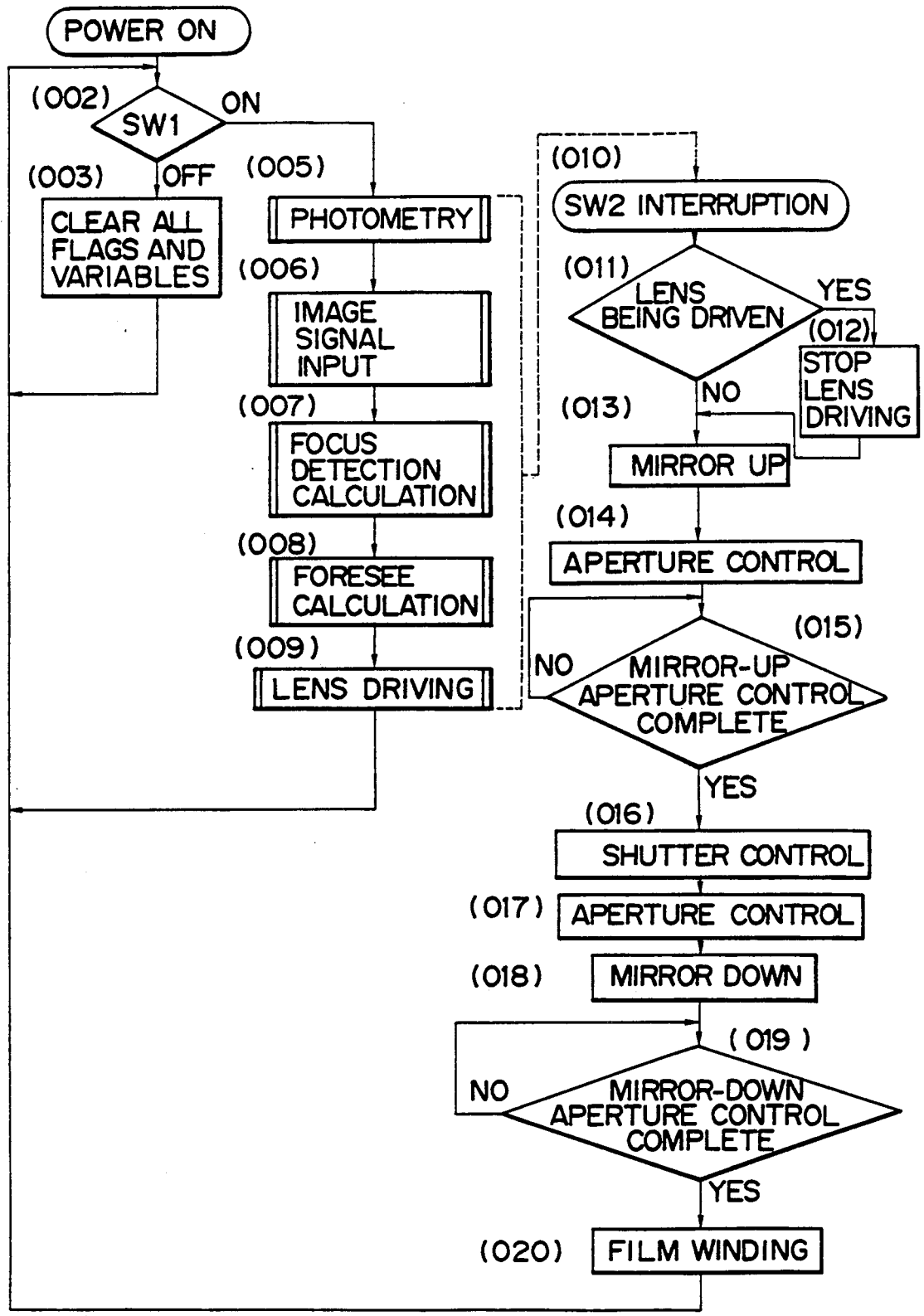
FIG. 5 is the main flow chart of the present invention.

FIG. 5 is a flow chart showing the flow of the whole of said program. When the execution of the program is started by the above-described operation, detection of the state of the switch SW1 adapted to be closed by the first-stage depression of the release button is effected at step (002) via step (001), and when the a switch SW1 is OFF, shift is made to step (003), where all flags and variables for control set in the RAM in the computer PRS are cleared and initialized.

The steps (002) and (003) are repeatedly executed until the switch SW1 is closed or the power source switch is opened. By the switch SW1 being closed, a shift is made from step (002) to step (005).

At step (005), the "photometry" sub-routine for exposure control is executed. The computer PRS inputs the output SSPC of the photometering sensor SPC shown in FIG. 4 to the analog input terminal, effects A/D conversion, calculates an optimum shutter control value and an optimum aperture control value from the digital photometric value thereof and stores them at a predetermined address of the RAM. During the releasing operation, it effects the control of the shutter and aperture on the basis of these values.

Figure 6:
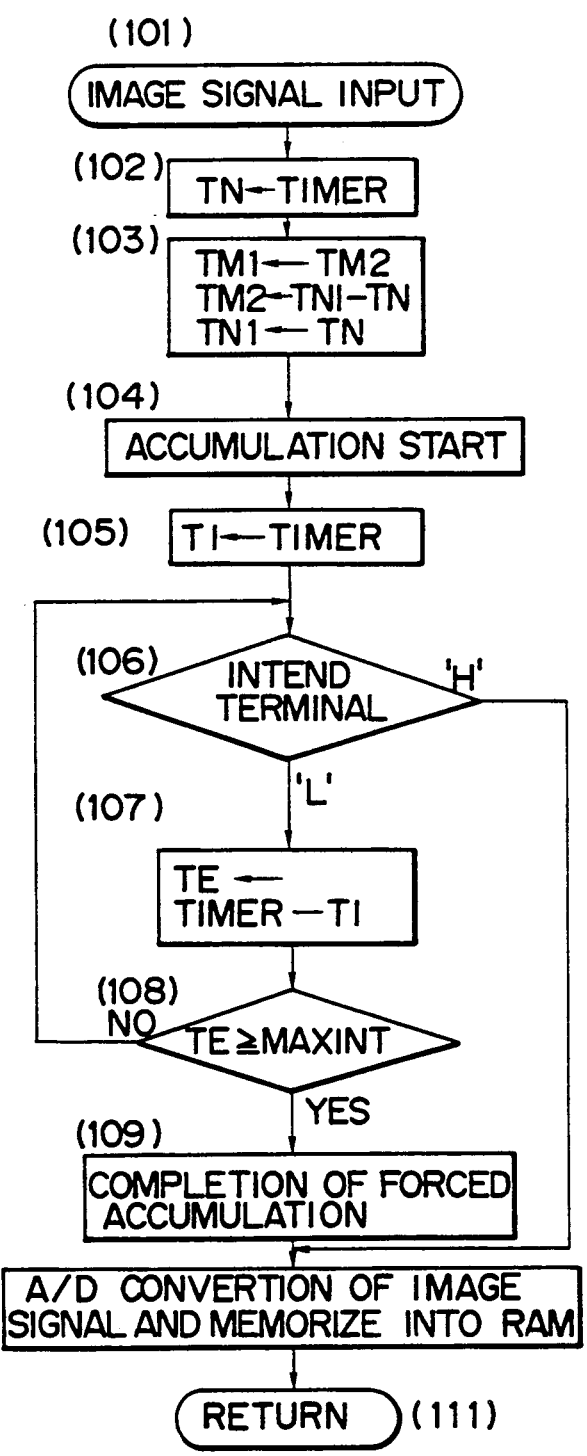
FIG. 6 is a flow chart of the "image signal input" sub-routine.

Subsequently, at step (006), the "image signal input" sub-routine is executed. The flow of this sub-routine is shown in FIG. 6, and the computer PRS effects the inputting of the image signal from the focus detecting sensor device SNS. The details will be described later.

At the next step (007), the defocus amount DEF of the photo-taking lens is calculated on the basis of the input image signal. The specific calculating method is disclosed by the applicant in Japanese Patent Application No. 61-160824, etc. and therefore need not be described in detail herein.

At step (008), the "foreseeing calculation" sub-routine is executed. In this "foreseeing calculation" sub-routine, correction of the amount of lens driving is effected, and the details thereof will be described later.

Figure 7:
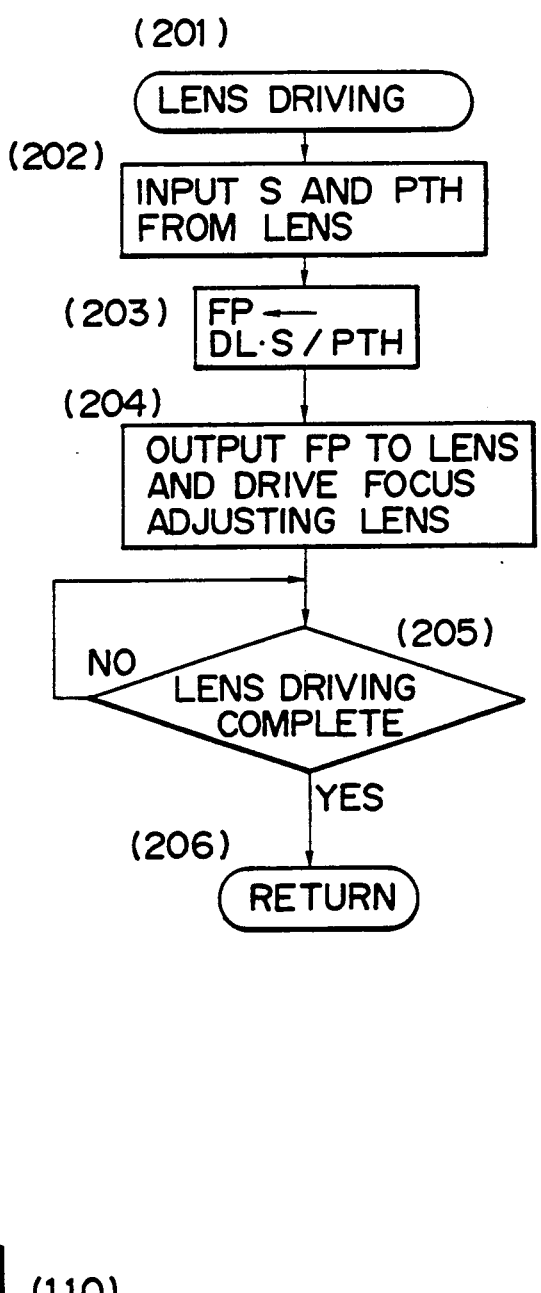
FIG. 7 is a flow chart of the "lens driving" sub-routine.

At the next step (009), the "lens driving" sub-routine is executed, and lens driving is effected on the basis of the amount of lens driving corrected at the previous step (008). The flow of this "lens driving" sub-routine is shown in FIG. 7. After the termination of lens driving, a shift is again made to step (002), and steps (005)–(009) are repeatedly executed until the switch SW1 is opened or the switch SW2 is closed by the second stroke of the release switch, not shown, whereby preferable focus adjustment is effected even for a moving object.

Now, when the release button is further depressed and the switch SW2 is closed, a shift is immediately made to step (010) by the interrupting function even at any step, and the releasing operation is started.

At step (011), whether lens driving is being executed is discriminated, and if the lens is being driven, a shift is made to step (012), where a command for stopping lens driving is delivered to stop the lens, and then an advance is made to step (013), and if the lens is not being driven, a shift is immediately made to step (013).

At step (013), the mirror-up movement of the quick return mirror of the camera is effected. This is executed by controlling motor control signals M2F and M2R shown in FIG. 4. At the next step (014), the aperature control value already stored in the photometry sub-routine of the previous step (005) is supplied as a SO signal to the control circuit LPRS in the lens through the circuit LCM to thereby effect aperture control.

Whether the mirror-up movement and the aperture control of steps (013) and (014) have been completed is detected at step (015)l and the mirror-up movement can be confirmed by means of a detecting switch, not shown, which is attendant on the mirror, and the aperture control is confirmed by communication as to whether driving has been effected to a predetermined aperture value for the lens. If one of them has not been completed, the program waits at this step and the detection of the state is continuedly effected. When the completion of the two controls is confirmed, a shift is made to step (016).

At step (016), control of the shutter is effected on the basis of the shutter time already stored in the photometry sub-routine of the previous step (005) and the film is exposed.

When the control of the shutter is completed, at step (017), a command for rendering the aperture open is supplied to the lens by the aforementioned communication operation, and subsequently, at step (018), mirror-down movement is effected. Mirror-down movement, like mirror-up movement, is executed by controlling the motor MTR2 by the use of the motor control signals M2F and M2R.

At the next step (019), as at step (015), completion of mirror-down movement and aperture opening is waited for, and when both of mirror-down movement and aperture opening control are completed, a shift is made to step At step (020), motor control signals M1F and M1R shown in FIG. 4 are properly controlled, whereby the film is advance by one frame.

What has been described above is the entire sequence of the camera in which foreseeing AF is carried out.

The "image signal input" sub-routine shown in FIG. 6 will now be described.

The "image signal input" is an operation which is executed at the beginning of a new focus detecting operation, and when this sub-routine is called, the timer value TIMER of the self-running timer of the microcomputer PRS itself is stored in a memory area TN on the RAM at step (102) via step (101),whereby the starting time of the focus detecting operation is memorized.

At the next step (103), TM1 and TM2 corresponding to the time intervals $TM_{n-2}$ and $TM_{n-1}$ in the lens driving amount correction equations (8), (9) and (10) are renewed. Before step (103) is executed, the time intervals $TM_{n-2}$ and $TM_{n-1}$ in the last focus detecting operation are memorized in TM1 and TM2, and the time when the last focus detecting operation has been started is memorized in TN1.

Accordingly, TM2 represents the time interval in the before-last to the last focus detecting operation, and TN1-TN represents the time interval in the last to the current focus detecting operation, and these are stored in the memory areas TM1 and TM2 on the RAM which correspond to $TM_{n-2}$ and $TM_{n-1}$ in the equations (8), (9) and (10). For the next focus detecting operation, the current focus detection starting time TN is stored in TN1.

Now, at the next step (104), the sensor device SNS is caused to start the accumulation of optical images. More specifically, the microcomputer PRS supplies an "accumulation starting command" to the sensor driving circuit SDR by communication, and in response thereto, the driving circuit SDR renders the clear signal CLR of the photoelectric conversion element portion of the sensor device SNS into "L" and causes the sensor device to start the accumulation of charges.

At step (105), the timer value of the self-running timer is stored in a variable TI and the current time is memorized.

At the next step (106), the state of the input INTEND of the computer PRS is detected, and whether the accumulation has been completed is examined. The sensor driving circuit SDR renders the signal INTEND into "L" simultaneously with the start of the accumulation, and monitors the AGC signal SAGC from the sensor device SNS, and when this signal SAGC reaches a predetermined level, the sensor driving circuit SDR renders the signal INTEND into "H" and at the same time, renders the charge transfer signal SH into "H" for a predetermined time, and causes the charges of the photoelectric conversion element portion to be transferred to the CCD portion.

If at step (106), the INTEND terminal is "H", it indicates completion of the accumulation and a shift is made to step (110), and if the INTEND terminal is "L", it means that the accumulation is not yet completed and a shift is made to step (107).

At step (107), the time TI memorized at step (105) is subtracted from the timer value TIMER of the self-running timer and the result is stored in a variable TE. Thus, the time from the start of the accumulation until now, i.e., the so-called accumulation time, is stored in TE. At the next step (108), TE is compared with a constant MAXINT, and if TE is less than MAXINT, a return is made to step (106), where the completion of the accumulation is again waited for. When TE becomes greater than MAXINT, a shift is made to step (109) and the accumulation is forcibly completed. The forcible completion of the accumulation is executed by an "accumulation completion command" being supplied from the computer PRS to the circuit SDR. When the "accumulation completion command" is supplied to the circuit SDR from the computer PRS, the circuit SDR renders the charge transfer signal SH into "H" for a predetermined time and causes the charges of the photoelectric conversion element portion to be transferred to the CCD portion. The accumulation in the sensor is completed by the flow up to step (109).

At step (110), the A/D conversion of a signal AOS resulting from the image signal OS of the sensor device SNS being amplified by the sensor driving circuit SDR and the memorization of the digital signal in the RAM are effected. More particularly, the sensor driving circuit SDR produces CCD driving clocks $\phi 1$ and $\phi 2$ in synchronism with the clock CK from the computer PRS and supplies them to the sensor device SNS, and the CCD portion of the sensor device SNS is driven by the clocks $\phi 1$ and $\phi 2$ and the charges in the CCD are time-serially output as an image signal from the output OS. This signal is amplified by an amplifier in the driving circuit SDR, whereafter it is input as AOS to the analog input terminal of the computer PRS. The computer PRS effects A/D conversion in synchronism with the clock CK which is being output by the computer itself, and the digital image signals after the A/D conversion are successively stored at predetermined address of the RAM.

When the inputting of the image signals is completed in this manner, the "image signal input" sub-routine is returned to the main program at step (111).

The flow chart of the "lens driving" sub-routine is shown in FIG. 7.

When this sub-routine is executed, communication is effected with the lens at step (202) and two data "S" and "PTH" are input. "S" is the coefficient of "the defocus amount vs. the amount of axial movement of the focus adjusting lens" inherent to the photo-taking lens, and for example, in the case of a totally axially moved type single lens, the entire photo-taking lens is the focus adjusting lens and therefore, S=1, and in the case of a zoom lens, S is varied by each zoom position. "PTH" is the amount of axial movement of the focus adjusting lens per output pulse from the encoder ENCF operatively associated with the movement of the focus adjusting lens LNS in the direction of the optic axis.

Thus, the value obtained by converting the amount of axial movement of the focus adjusting lens into the output pulse number of the encoder by the defocus amount DL to be focus-adjusted and said S and PTH, i.e., the so-called amount of lens driving FP, is given by the following equation:

$$FP = DL \times S/PTH$$

Step (203) executes the above equation as it is.

At step (204), FP found at step (203) is output to the lens and the driving of the focus adjusting lens (in the case of a totally axially moved type single lens, the entire photo-taking lens) is commanded.

At the next step (205), communication is effected with the lens and at step (206), whether the commanded driving by the amount of lens driving FP has been completed is detected, and when the driving is completed, a shift is made to step (206), where the "lens driving" sub-routine is returned to the main program. This detection of the completion of the lens driving is executed by counting the pulse signal of the encoder ENCF by a counter in the control circuit LPRS as described above, and detecting by the above-mentioned communication whether the count value has coincided with the amount of lens driving FP.

Figure 1:
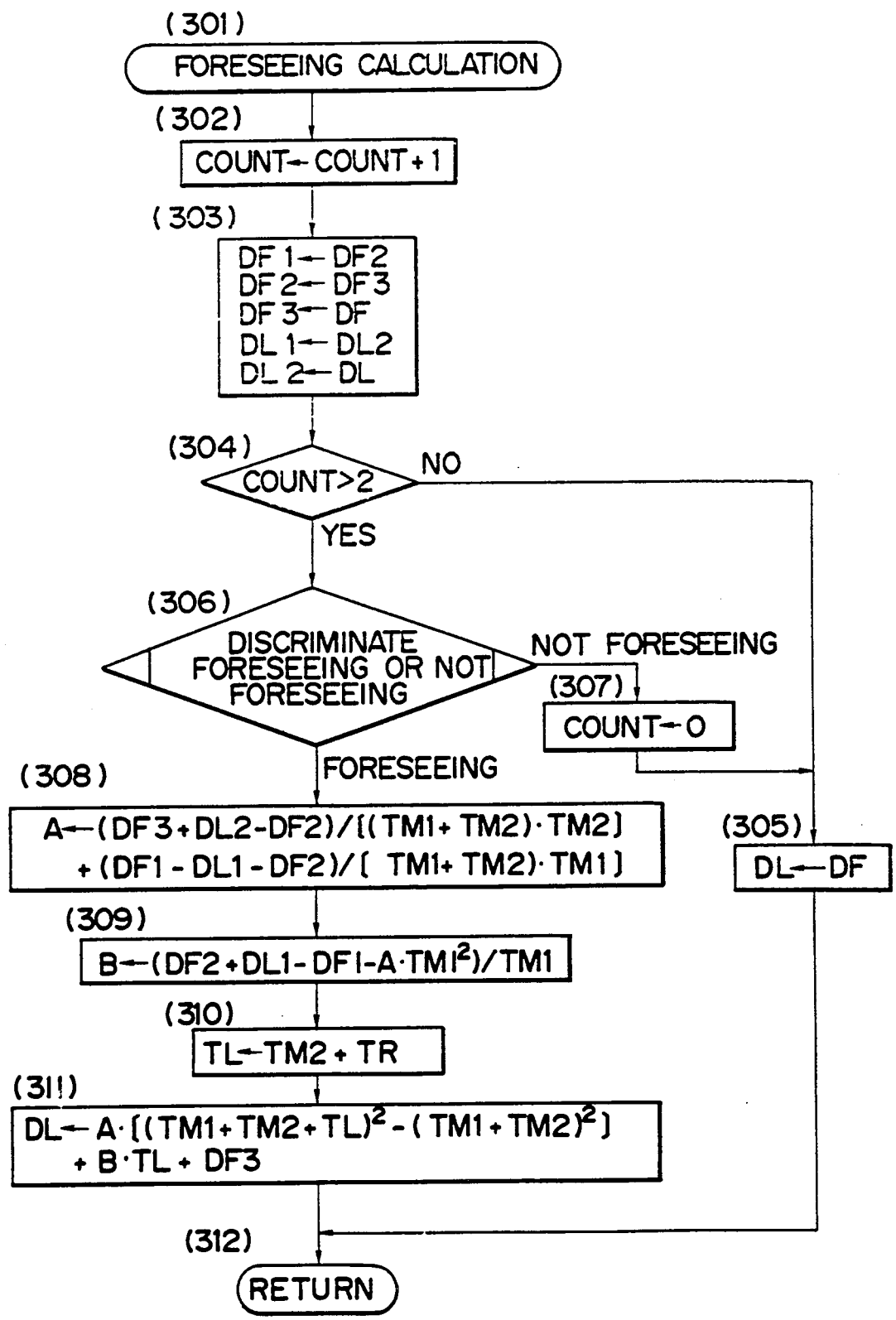
FIGS. 1 and 10 are the flow charts of the "foreseeing calculation" of the present invention.

The flow of the "foreseeing calculation" subroutine will now be described with reference to FIG. 1. FIG. 1 shows the flow of the "foreseeing calculation" sub-routine, in which the right or wrong state of the foreseeing calculation is discriminated and if the foreseeing is possible, the amount of lens driving which takes AF the time-lag and the release time-lag into account is calculated.

At step (302), the number of data is integrated by a counter COUNT to discriminate whether the accumulation of data necessary for foreseeing has been done. At the next step (303), renewal of the data for the current foreseeing calculation is effected.

Figure 2:
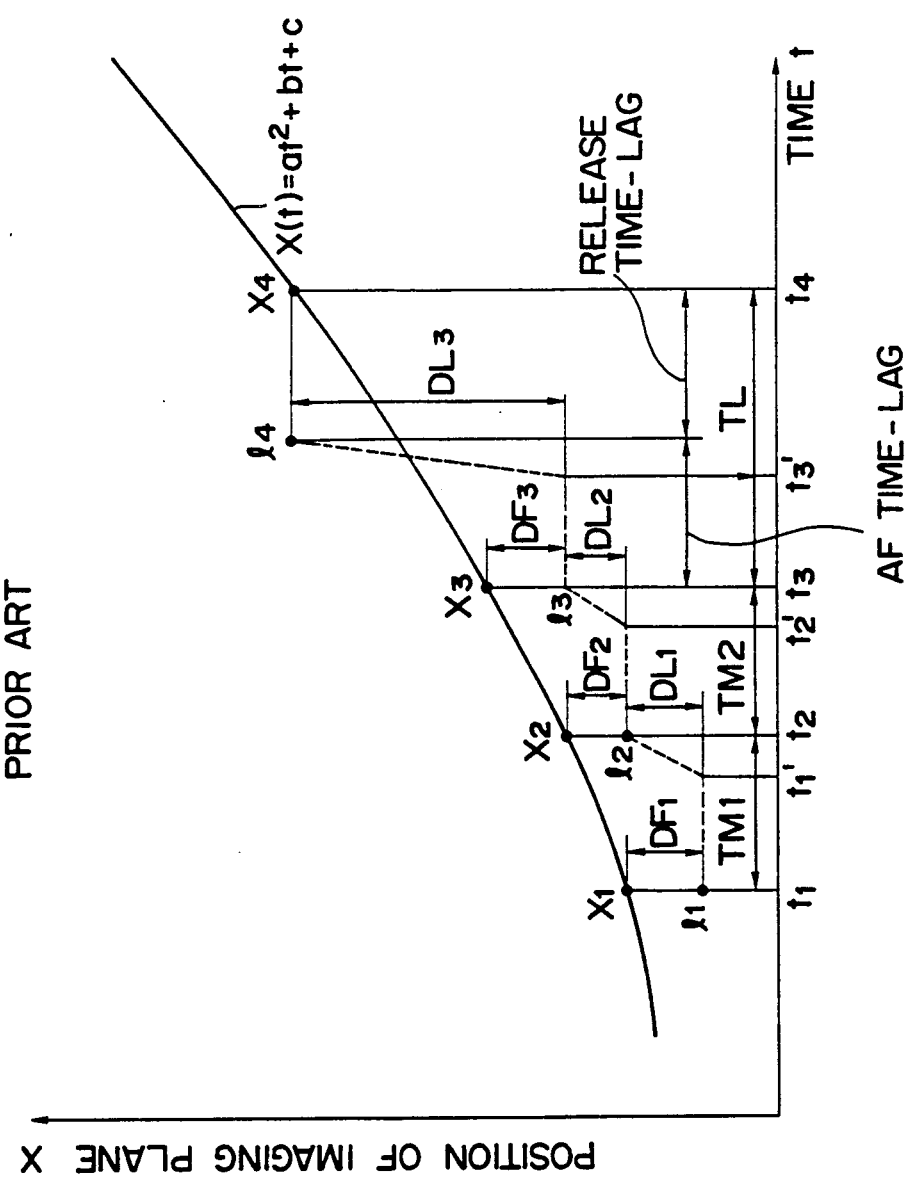
FIG. 2 illustrates the principle of foreseeing and pursuit correction.
Figure 3:
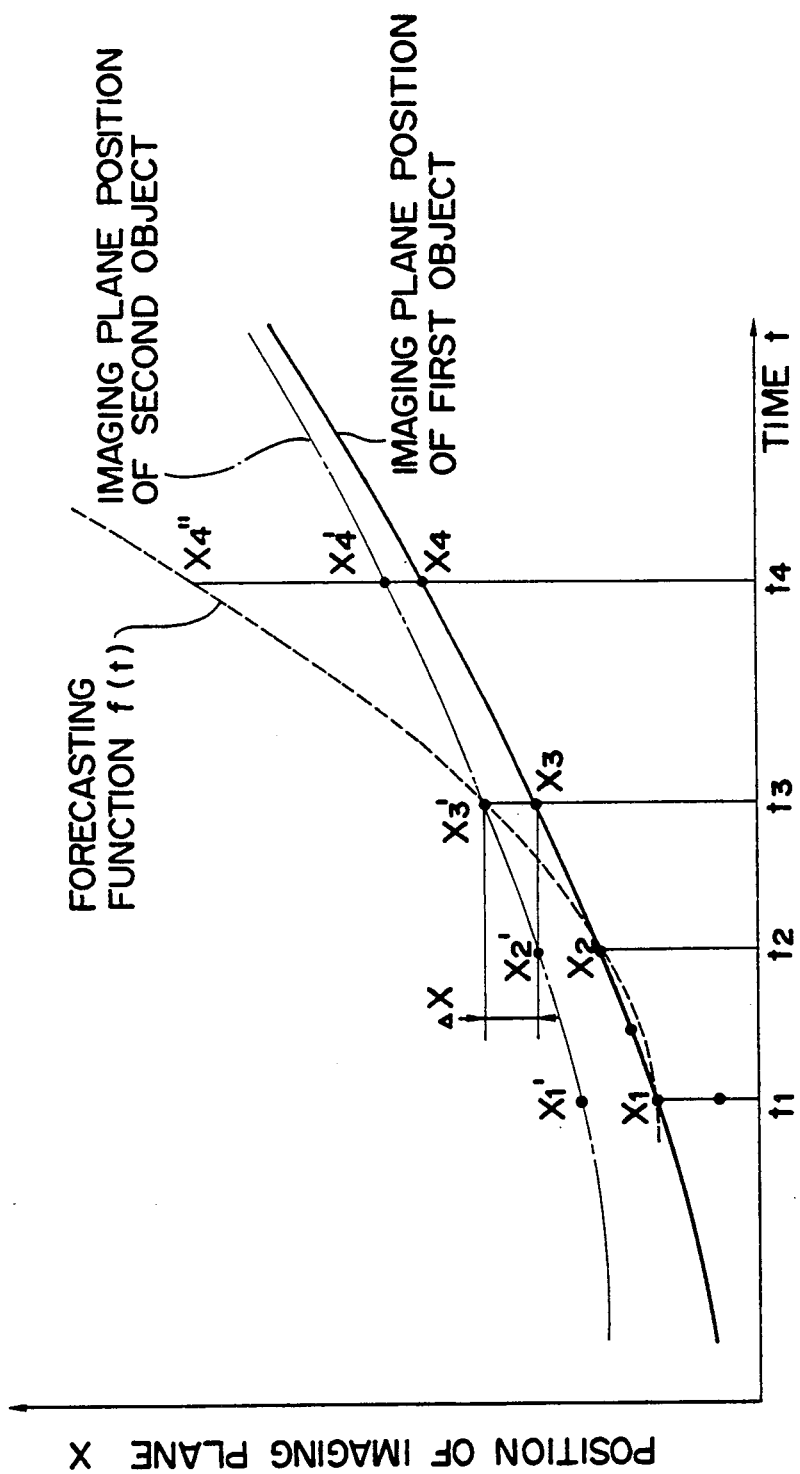
FIG. 3 illustrates the prior art.

That is, the foreseeing calculation is effected on the basis of the equations (6), (7), (8) and (9) and therefore, as the data thereof, the current defocus amount $DF_3$, the last and before-last defocus amounts $DL_1$ and $DL_2$, the last amount of lens driving $DL_1$, the last and before-last time intervals $TM_1$ and $TM_2$ and the current time interval TL in FIG. 2 are required. Consequently, at step (303), the defocus amount DF detected and calculated currently is input to a memory area $DF_3$ on the RAM each time focus detection is effected, and the last defocus amount is input to a memory area $DF_2$, and the before-last defocus amount is input to a memory area $DF_1$, and further, the last amount of lens driving DL is input to a memory area $DL_2$, and the before-last amount of lens driving is input to a memory area $DL_1$, and the data in the various memory areas are renewed into the latest past data necessary for the calculation by each of the above-mentioned equation with the current data as the reference.

At step (304), whether the data necessary for the foreseeing calculation are input to said various memory areas is discriminated. As described above, the foreseeing calculation requires the defocus amounts for at least three times, i.e., the current time, the last time and the before-last time, and is effected on the condition that the focus adjusting operation of steps (006)–(009) is effected at the past three or more times (including the current time). Consequently, at step (302), +1 is effected on the counter COUNT each time the focus adjusting operation is performed, and the counter is caused to count the number of times at which the focus adjusting operation has been performed, and whether the number of times has become greater than 2, that is, whether said operation has been performed three or more times, is discriminated, and when said operation has been performed three or more times and the foreseeing calculation is possible, a shift is made to step (306), and when the foreseeing calculation is impossible, a shift is made to step (305).

At step (305), this foreseeing calculation is completed with the currently detected defocus amounts as the amount of lens driving DL (identical to the defocus amount DL in FIG. 7) converted into the amount of movement of the imaging plane, and in the lens driving sub-routine of FIG. 7, lens driving based on this DL is effected.

Also, when an advance is made to step (306), whether the accumulated data are suited for foreseeing, that is, whether the same object has been distance-measured, is discriminated in the "foreseeing or not foreseeing discrimination" sub-routine. When in this "foreseeing or not foreseeing discrimination" sub-routine, it is judged that the data of said memory areas used for foreseeing are not suited for fore-seeing, a shift is made to step (307), and at this step, the counter COUNT is reset, and then an advance is made to step (305). Consequently, in this case, lens driving based on the defocus amount detected at the current time is effected. When it is judged that said data are suited for foreseeing, a shift is made to step (308).

At step (308), calculation of the equation (6) is effected on the basis of the data of said memory areas, and at step (309), calculation of the equation (7) is effected.

At the next step (310), the time interval TL is found by adding the data of the memory- area TM2 and the release time-lag TR (constant) together, and at step (311), calculation of the equation (9) is effected. Thereafter, at step (312), a return is made to the main program.

In the above-described foreseeing calculation sub-routine, the amount of lens driving DL is found by the calculation of the equation (9), and in the lens driving sub-routine, the lens is driven to the foreseen position based on said DL.

Figure 8:
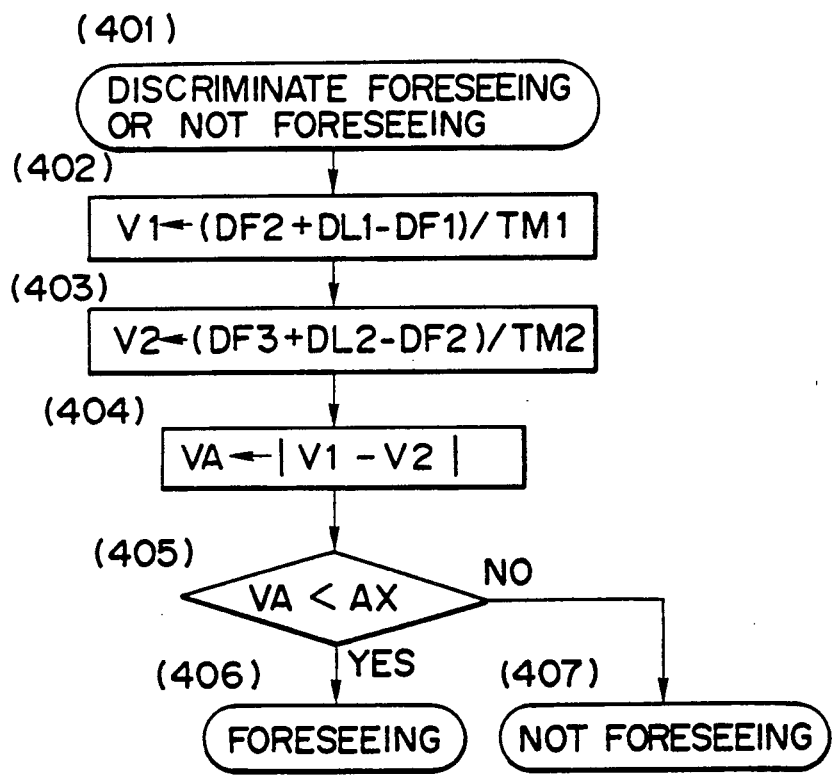
FIGS. 8, 9, 11, 12 and 13 are flow charts of the "foreseeing or not foreseeing discrimination" sub-routine.

Reference is now had to FIG. 8 to describe the "foreseeing or not foreseeing discrimination" sub-routine at the step (306) in the "foreseeing calculation" sub-routine.

At step (402), the calculation of $(DF2+DL1-DF1)/TM1$ is effected on the basis of the data of each memory area. This calculation is the step of calculating the average value V1 of the velocity of movement of the imaging plane between the times $t_1$ and $t_2$ in FIG. 2. The calculation at the next step (403) is likewise the step of calculating the average value V2 of the velocity of movement of the imaging plane between the times $t_2$ and $t_3$. Thereafter, advance is made to step (404).

At step (404), the absolute value VA of the difference between the velocities of movement of the imaging plane V1 and a V2 found at steps (402) and (403) is calculated, and shift is made to step (405).

At step (405), the absolute value VA found at step (404) is compared with a preset number AX, and when VA is greater than AX, not foreseeing is judged, and when VA is smaller than AX, it is judged that foreseeing is possible.

The principle of foreseeing or not foreseeing discrimination by the above-described flow is based on the fact that if the same object is pursued, the then velocity of movement of the imaging plane also varies continuously. So, the velocities of movement of the imaging plane adjacent in time are calculated and if the difference therebetween is small, the velocity of movement of the imaging plane is regarded as varying continuously, and foreseeing calculation is effected with it being judged that the same object is being distance-measured. In contrast, when the variation in the velocity of movement of the imaging plane is sufficiently great, the velocity of movement of the imaging plane is regarded as not varying continuously, and it is judged that another object has been distance-measured, and foreseeing calculation is inhibited.

Figure 9:
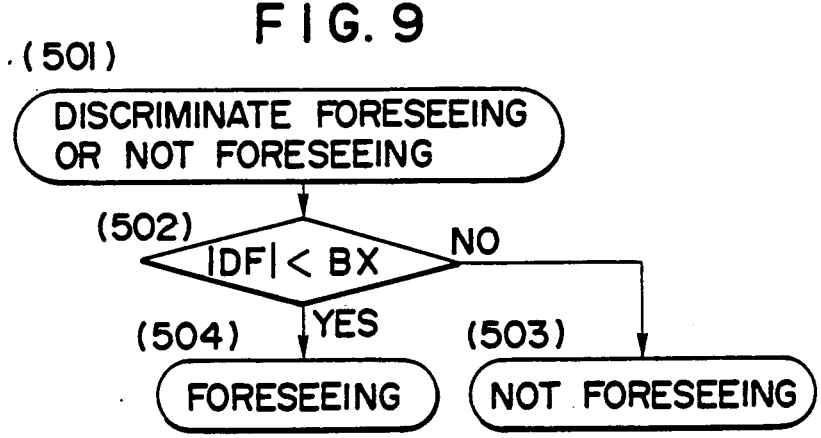

FIG. 9 shows the flow of another embodiment of the "foreseeing or not foreseeing discrimination" sub-routine. This sub-routine is such that when the absolute value of the detected defocus amount DF becomes greater than a certain value BX, it is judged that another object has been distance-measured, and foreseeing calculation is inhibited.

That is, in a state in which the same object is pursued and measured, it is rarely the case that the detected defocus amount varies greatly, and when the detected defocus amount is greater than a predetermined value, not foreseeing is judged.

Summing up the above-described operation, the camera of the present invention operates as follows.

In a state in which the first stroke operation of the release operating member is effected, the "photometry", "image signal input", "focus detection calculation", "foreseeing calculation" and "lens driving" sub-routines are executed repeatedly. In the "image signal input" sub-routine, the time intervals required for the last and the before-last focus detection and lens driving are memorized in the memory areas TM1 and TM2, and in the "focus detection calculation" sub-routine, the current defocus amount DF is found. In the "foreseeing calculation" sub-routine, until after the first stroke operation, a series of focus detecting operations comprising said focus detection and said lens driving are performed two or more times in the past, lens driving based on the defocus amount found at that point of time is effected and the foreseeing calculation process is not effected.

Also, when the above-mentioned series of focus detecting operations are effected two or more times in the past, the foreseeing calculation shown in the equation (9) is effected on the basis of the defocus amounts DF1, DF2 and DF3 in the last, before-last and current focus detecting operations, the amounts of lens driving DL1 and DL2 converted into the amounts of movement of the imaging plane conforming to the last and before-last defocus amounts DF1 and DF2, and the last and before-last focus detecting operation time intervals TM1 and TM2 and the current predetermined focus detecting operation time TL, and lens driving is effected on the basis of the focus detection data in the past to bring the imaging plane position of the object into coincidence with the imaging plane position of the lens. When in this foreseeing calculation process, the velocity in the former continuous imaging plane moving operation varies greatly or the detected defocus amount becomes great, an object differing from the former object is regarded as being grasped in the distance measuring field, and the control of the amount of lens driving found by the equation (9) is inhibited, and lens driving is effected in conformity with the defocus amount for the object which has currently been focus-detected.

When by the above-described operation, the imaging plane position is being controlled on the basis of the past focus detection data so as to bring the lens always into coincidence with the imaging plane position of the object, if focus detection for an object differing from the former object is effected, lens driving is effected to make the lens in focus to the current object.

Figure 10:
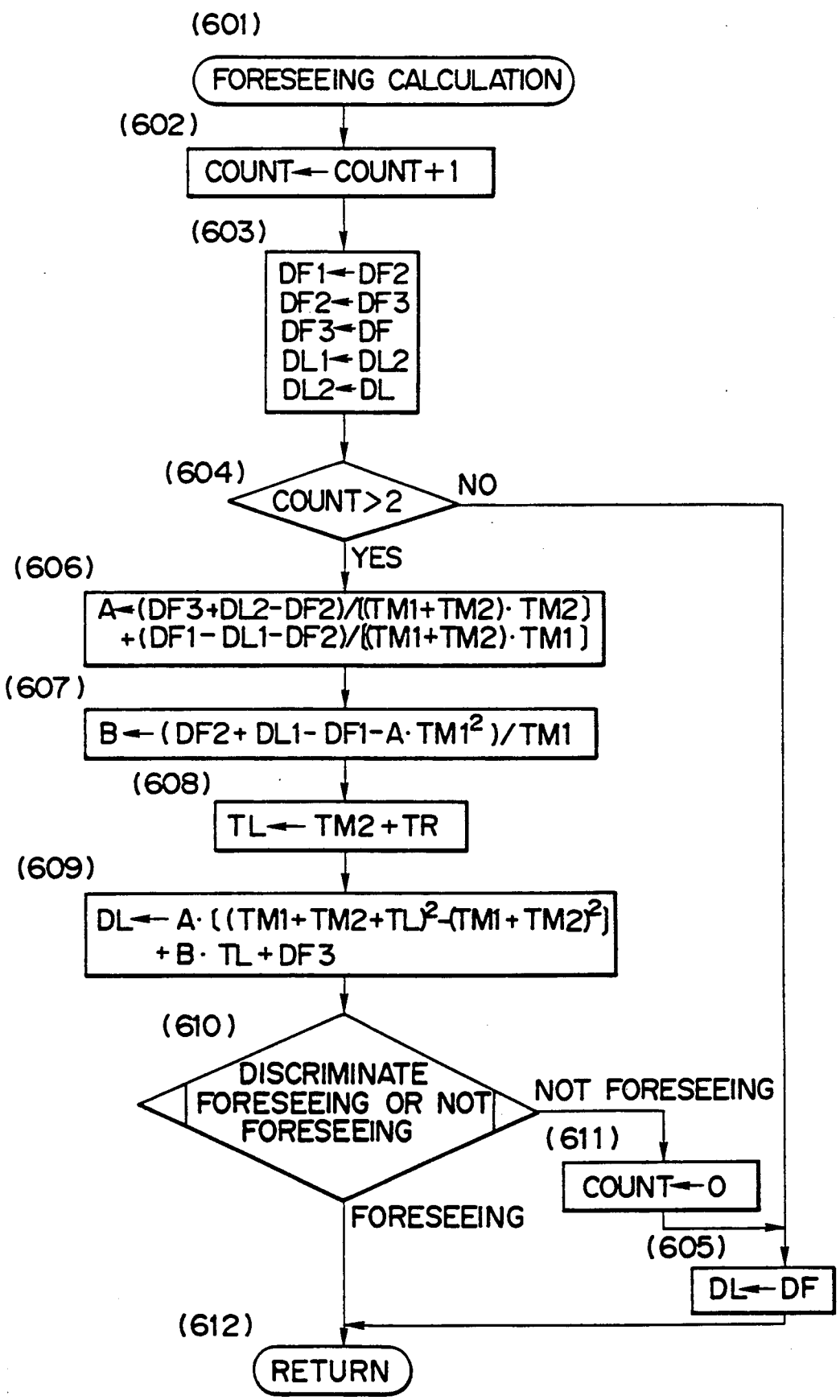

FIG. 10 is a flow chart showing another embodiment of the above-described "foreseeing calculation" sub-routine. This sub-routine differs from the embodiment of FIG. 1 in that after the calculation of the aforementioned equation (9) up to steps (606)–(609) is effected, the "foreseeing or not foreseeing discrimination" sub-routine is executed at step (610), and is the same as the embodiment of FIG. 1 in the other operations and therefore, need not be described.

Figure 11:
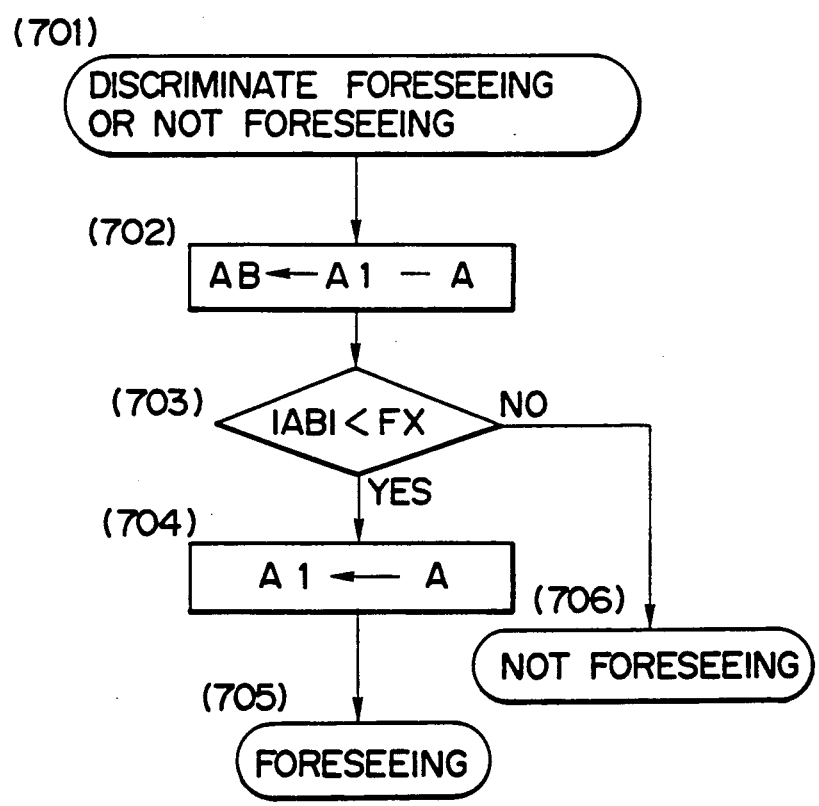

FIG. 11 is a flow chart showing an example of the "foreseeing or not foreseeing discrimination" sub-routine adopted in the "foreseeing calculation" sub-routine shown in FIG. 10.

At step (702) in FIG. 11, the difference AB between the current coefficient A of the equation (6) found at the step (606) of FIG. 10 and the last coefficient A1 of the equation (6) found in the last "foreseeing calculation" sub-routine is found. That A1 is input to A1 each time a new A is found at step (704) and therefore, is renewed each time A is found, and the coefficient A found in the last focus detecting operation is always input.

At step (703), a comparison between the absolute value of said AB and a predetermined value FX is made, and when $|AB| < FX$, an advance is made to step (704), where said coefficient A is renewed and foreseeing is judged as possible.

Also, when the absolute value of said AB is greater than FX, shift is made to step (706) and foreseeing is judged as impossible.

The principle of discrimination shown in FIG. 11 is such that if the same object is being distance-measured, the imaging plane position varies continuously and at this time, the coefficient of a foreseeing function is also regarded as varying continuously and the variation in the coefficient A of the secondary term of the foreseeing function is examined and when the variation in the value of A is small, foreseeing is judged as possible. Here, attention has been paid to only the coefficient A of the secondary term, but judgement may be made from the variation in the coefficient B of the primary term or the coefficient of the primary and secondary terms. That is, the term a or b of the foreseeing function x(t) of FIG. 2 does not vary very greatly for the same object during each focus detecting operation and therefore, the magnitude of the rate of variation of the term a or b is detected and foreseeing or not foreseeing discrimination is effected.

Figure 12:
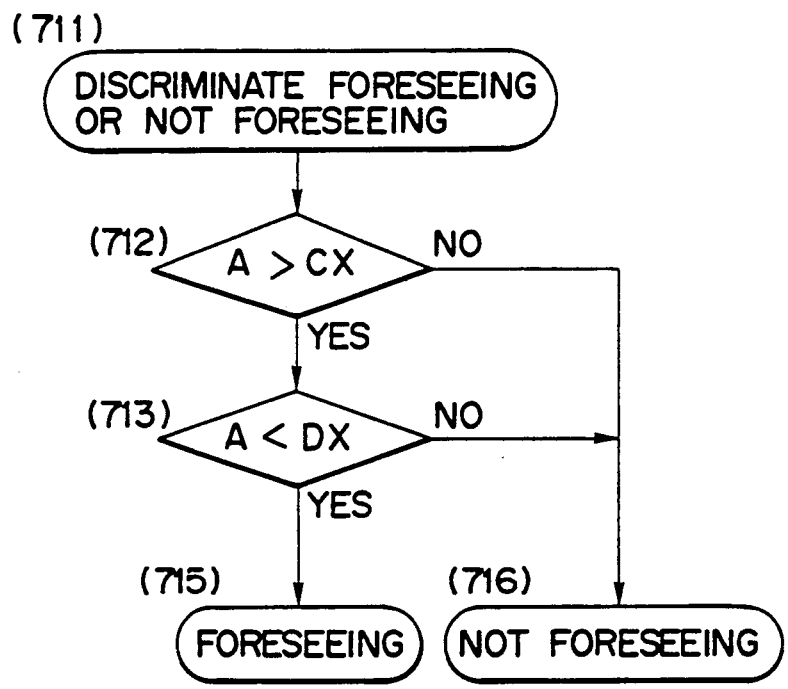

FIG. 12 shows another "foreseeing or not foreseeing discrimination" sub-routine adopted in FIG. 10, and the flow thereof will hereinafter be described.

The principle of FIG. 12, pays attention to the fact that when the object being distance-measured shifts to another object in the course of measurement, the influence thereof presents itself better in the secondary term A than in the primary term B of said foreseeing function and the absolute values of A becomes very great, and by the absolute value of A, foreseeing is judged as possible or impossible.

If at step (712), the coefficient A of the secondary term of the foreseeing function is greater than a certain number CX, an advance is made to step (713), and if not so, a shift is made to step (716), where foreseeing is judged as impossible. The arbitrary number CX is a negative number.

At step (713), when the coefficient A of the secondary term of the foreseeing function is greater than a certain number DX, foreseeing is judged as impossible, and an advance is made to step (716) and when A is smaller than DX, a shift is made to step (715), where foreseeing is judged as possible. DX is a positive number.

Figure 13:
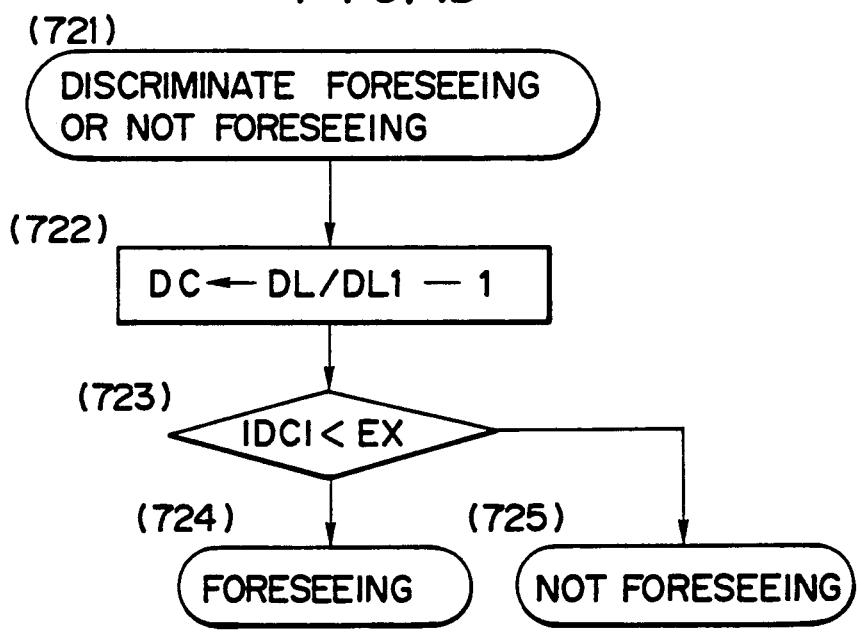

FIG. 13 is a flow showing another example of the "foreseeing or not foreseeing discrimination" sub-routine, and this flow judges from the variation in the amount of lens driving whether foreseeing is possible. In this flow, the last amount of lens driving DL1 is compared with the current amount of lens driving DL, and if the rate of variation therein is greater than a certain number EX, foreseeing is judged as impossible.

In all the above-described embodiments, whether distance measurement is being effected for the same object has been judged by the continuity of the variation in the velocity of movement of the imaging plane or the imaging plane position, but it is apparent that the present invention is also effective using discrimination means comprising a combination of these embodiments. Also, as entirely discrete discrimination means, the last image signal may be compared with the image signal obtained by the current distance measurement and, when it is judged that the two image signals are of the same object, foreseeing calculation may be effected.

We claim:
1. A focus adjusting apparatus or camera having a focus adjusting apparatus, comprising:
   (a) a focus signal forming circuit for repeatedly detecting the focus state of a lens and outputting a focus signal corresponding to the detected focus state;
   (b) a calculating circuit for providing a signal corresponding to an amount of lens driving for making the lens in focus to an object after a predetermined time on the basis of a past focus signal;
   (c) a lens driving circuit for driving the lens in conformity with the signal provided by said calculating circuit;
   (d) a discrimination circuit for detecting a variation of the focus state of the lens, and for judging whether said signal corresponds to a focusing state to the same object as the past focus signal by evaluating whether the variation is changed by a predetermined amount from the previous detected focus state; and
   (e) a control circuit for permitting the lens to be driven by said lens driving circuit in accordance with the signal provided by said calculating circuit when it is judged by said discrimination circuit that the focus signal from said focus signal forming circuit is detected for the same object as the past focus signal, and for inhibiting the lens driving by said lens driving circuit in accordance with the signal provided by said calculating circuit when it is judged by said discrimination circuit that the focus signal from said focus signal forming circuit is not detected for the same object as the past focus signal.

2. A focus adjusting apparatus or a camera according to claim 1, wherein said discrimination circuit detects a continuity of a variation in the signal provided by said calculating circuit, and discriminates whether the signal is a signal conforming to the focus state detected for the same object as the past focus signal.

3. A focus adjusting apparatus or a camera according to claim 1, wherein said discrimination circuit detects the continuity of a varying rate of said focus signal and determines whether the signal conforms to a focusing state of the lens to the same object as the past focus signal.

4. A focus adjusting apparatus or a camera according to claim 1, wherein said calculating circuit calculates the imaging plane position of the object after said predetermined time on the basis of a predetermined functional equation.

5. A focus adjusting apparatus or a camera according to claim 4, wherein said discrimination circuit detects the continuity of the variation in the imaging plane position of said object, and discriminates whether the signal is a signal conforming to the focus state detected for the same object as the past focus signal.

6. A focus adjusting apparatus or a camera according to claim 4, wherein said discrimination circuit detects a continuity of the speed of variation in the imaging plane position on the basis of data used by said calculating circuit to find the imaging plane position, and performs the judging operation using said detected continuity.

7. A focus adjusting apparatus or a camera according to claim 4, wherein said discrimination circuit detects the continuity of the value of a coefficient of said predetermined functional equation, and performs the judging operation based thereon, said coefficient being determined by said calculating circuit on the basis of a plurality of focus signals from the past.

8. A focus adjusting apparatus or a camera according to claim 1, wherein said discrimination circuit detects the continuity of a variation in the amount of lens driving, and performs the judging operation based thereon.

9. A focus adjusting apparatus or camera having a focus adjusting apparatus, comprising:
(a) a focus signal forming circuit for repeatedly detecting the focus state of a lens and outputting a focus signal corresponding to the detected focus state;
(b) a calculating circuit for providing a signal corresponding to an amount of lens driving for making the lens in focus to an object after a predetermined time based on a focus signal from the past;
(c) a lens driving circuit for driving the lens in conformity with the signal provided by said calculating circuit;
(d) a discrimination circuit for detecting a variation of the focus state of the lens, and for judging whether said signal corresponds to a focusing state to the same object as the past focus signal by evaluating whether the variation is changed by a predetermined amount from the previous detected focus state; and
(e) a control circuit for permitting the calculation by said calculating circuit and permitting the lens to be driven by said lens driving circuit in accordance with the signal provided by said calculating circuit when it is judged by said discrimination circuit that the focus signal from said focus signal forming circuit is a focus signal detected for the same object as the past focus signal, and for inhibiting the lens driving by said lens driving circuit in accordance with the signal provided by said calculating circuit when it is judged by said discrimination circuit that the focus signal from said focus signal forming circuit is not a focus signal detected for the same object as the past focus signal.

10. A focus adjusting apparatus or a camera according to claim 9, wherein said discrimination circuit detects the continuity of a variation rate in the focus signals from said focus signal forming circuit, and discriminates whether the focus signal is a signal conforming to the focus state detected for the same object.

11. A focus adjusting apparatus or a camera according to claim 9, wherein said calculating circuit calculates the imaging plane position of the object after said predetermined time on the basis of a predetermined functional equation.

12. A focus adjusting apparatus or a camera according to claim 11, wherein said discrimination circuit detects a continuity of variation in the imaging plane position on the basis of data used to find the imaging plane position by said calculating circuit, and performs the discriminating operation based on said imaging plane variation continuity.

13. A focus adjusting apparatus or a camera according to claim 9, wherein said discrimination circuit detects a continuity of variation in the amount of lens driving and performs the discriminating operation based thereon.

14. A focus adjusting apparatus provided with a focus detecting circuit for repeatedly detecting the focus state of a lens for an object, or a camera having said focus adjusting apparatus, comprising:
(a) a calculating circuit for calculating information for making the lens in focus to the object after a predetermined time on the basis of the focus state of the lens for the object detected in the past;
(b) a lens driving circuit for driving the lens in accordance with the information calculated by said calculating circuit;
(c) a discriminating circuit for detecting a continuity of varying speed of the focus state to determine whether focus state detections are performed to the same object; and
(d) a determining circuit for determining, in accordance with the result of the determination by said discriminating circuit, whether lens driving based on said information calculated by said calculating circuit should be permitted.

15. A focus adjusting apparatus or a camera according to claim 14, wherein said discriminating circuit detects a continuity of a variation in the information calculated by said calculating circuit, and performs the determination operation based thereon.

16. A focus adjusting apparatus or a camera according to claim 14, wherein said discriminating circuit detects a continuity of a variation in the focus state detected by said focus detecting circuit, and performs the determination operation based thereon.

17. A focus adjusting apparatus or a camera according to claim 14, wherein said calculating circuit calculates the imaging plane position of the object after said predetermined time on the basis of a predetermined functional equation.

18. A focus adjusting apparatus or a camera according to claim 14, wherein said discriminating circuit detects the continuity of the variation in the imaging plane position of said object, and determines whether the information is information conforming to the focus state detected for the same object as in the past.

19. A focus adjusting apparatus or a camera according to claim 17, wherein said discriminating circuit detects a continuity of the speed of variation in the imaging plane position on the basis of data used to find the imaging plane position by said calculating circuit, and performs the determination operation based on the continuity of speed variation of the imaging plane position.

20. A focus adjusting apparatus or a camera according to claim 17, wherein said discriminating circuit detects a continuity of the value of a coefficient of said predetermined functional equation and performs said determination operation based thereon, said coefficient being determined by said calculating circuit on the basis of a plurality of past detected focusing states.

21. A focus adjusting apparatus or a camera according to claim 14, wherein said discriminating circuit detects a continuity of a variation in the amount of lens driving, and performs the determination operation based thereon.

22. A focus adjusting apparatus provided with a focus detecting circuit for repeatedly detecting the focus state of a lens for an object, or a camera having said focus adjusting apparatus, comprising:
(a) a calculating circuit for calculating information for making the lens in focus to the object after a predetermined time on the basis of a detected past focus state of the lens for the object;
(b) a lens driving circuit for driving the lens in conformity with the information calculated by said calculating circuit;
(c) a discriminating circuit for detecting a continuity of varying speed of the focus state of the lens to determine whether past and present focus state detections are performed for the same object; and
(d) a determining circuit for permitting the calculation by said calculating circuit in conformity with the result of the determination by said discriminating circuit, and for determining whether the lens driving based on the information conforming to the result of said calculation should be permitted.

23. A focus adjusting apparatus or a camera according to claim 22, wherein said discriminating circuit detects a continuity of a variation in the focus state of the lens detected by the focus detecting circuit, and performs the determination operation based thereon.

24. A focus adjusting apparatus or a camera according to claim 22, wherein said calculating circuit calculates the imaging plane position of the object after said predetermined time on the basis of a predetermined functional equation.

25. A focus adjusting apparatus or a camera according to claim 24, wherein said discriminating circuit detects a continuity of the speed of variation in the imaging plane position on the basis of data used by said calculating circuit to find the imaging plane position, and performs the determination operation based on the detected continuity of the speed of variation in the imaging plane position.

26. A focus adjusting apparatus or a camera according to claim 22, wherein said discriminating circuit detects a continuity of variation in the amount of lens driving and performs the determination operation based thereon.

27. A focus adjusting apparatus or camera having a focus adjusting apparatus, comprising:
(a) a focus signal forming circuit for repeatedly detecting the focus state of a lens and outputting a focus signal corresponding to the detected focus state;
(b) a calculating circuit for providing a signal concerned in the amount of lens driving for making the lens in focus to an object after a predetermined time on the basis of a past focus signal;
(c) a lens driving circuit for driving the lens in conformity with the signal provided by said calculating circuit;
(d) a discriminating circuit for detecting a variation of the focus state of the lens, and for judging whether said signal corresponds to a focusing state to the same object as the past focus signal by evaluating whether the variation is changed by a predetermined amount from the previous detected focus state; and
(e) a control circuit for changing a control state of said lens driving circuit based on the judgement by said discrimination circuit.

28. A focus adjusting apparatus or camera having a focus adjusting apparatus, comprising:
(a) a focus signal forming circuit for repeatedly detecting the focus state of a lens and outputting a focus signal corresponding to the detected focus state;
(b) a calculating circuit for providing a signal concerned in the amount of lens driving for making the lens in focus to an object after a predetermined time on the basis of a past focus signal;
(c) a lens driving circuit for driving the lens in conformity with the signal provided by said calculating circuit;
(d) a discrimination circuit for detecting a variation of the lens focusing state, and for judging whether said signal corresponds to a focus state of the lens to the same object as the past focus signal by evaluating whether the variation is changed by a predetermined amount from the previously detected focus state; and
(e) a control circuit for permitting the calculation by said calculating circuit and permitting the lens driving by said lens driving circuit in accordance with the signal provided by said calculating circuit when it is judged by said discrimination circuit that the focus signal from said focus signal forming circuit is a focus signal detected for the same object as the past focus signal, and for inhibiting the calculation by said calculating circuit and inhibiting the lens driving by said lens driving circuit in accordance with the signal provided by said calculating circuit when it is judged by said discrimination circuit that the focus signal from said focus signal forming circuit is not a focus signal detected for the same object as the past focus signal.

* * * * *

UNITED STATES PATENT AND TRADEMARK OFFICE
CERTIFICATE OF CORRECTION

PATENT NO. : 5,061,953

DATED : October 29, 1991

INVENTOR(S) : Masaki Higashihara, et al.

It is certified that error appears in the above-identified patent and that said Letters Patent is hereby corrected as shown below:

COLUMN 2:
    Line 17, "25" should be deleted; and
    Lines 17-23, italics should be deleted.

COLUMN 4:
    Line 19, "invention" should read --invention,--; and
    Line 37, "an" should read --a--; and "a" should read --and--.

COLUMN 5:
    Line 55, "charg-" should read --down and charg- --; and
    Line 56, "down and" should be deleted.

COLUMN 6:
    Line 12, "VS." should read --VS,--; and
    Line 62, "shift" should read --a shift--.

COLUMN 7:
    Line 57, "step (015)1" should read --step (015),--.

COLUMN 8:
    Line 15, "step" should read --step (202)--;
    Line 18, "advance" should read --advanced--;
    Line 28, "on" should read --of--; and
    Line 43, "on" should read --of--.

COLUMN 10:
    Line 32, "AF the" should read --the AF--;
    Line 43, "$DL_1$ and $DL_2$," should read -- $DF_1$ and $DF_2$, the before - last amount of lens driving $DL_2$,--; and
    Line 57, "equation" should read --equations--.

UNITED STATES PATENT AND TRADEMARK OFFICE
CERTIFICATE OF CORRECTION

PATENT NO. : 5,061,953

DATED : October 29, 1991

INVENTOR(S) : Masaki HIGASHIHARA, et al.

It is certified that error appears in the above-identified patent and that said Letters Patent is hereby corrected as shown below:

<u>COLUMN 11</u>:
    Line 36, "memoray - area" should read --memory area--;
    Line 62, "a" should be deleted; and
    Line 63, "shift" should read --a shift--.

<u>COLUMN 12</u>:
    Line 66, "and" should be deleted.

<u>COLUMN 13</u>:
    Line 33, "to-step" should read --to step--;
    Line 37, "shift" should read --a shift--; and
    Line 66, "values" should read --value--.

<u>COLUMN 14</u>:
    Line 55, "previous" should read --previously--.

<u>COLUMN 15</u>:
    Line 59, "previous" should read --previously--.

<u>COLUMN 18</u>:
    Line 22, "previous" should read --previously--.

Signed and Sealed this

Fifteenth Day of June, 1993

Attest:

MICHAEL K. KIRK

Attesting Officer      Acting Commissioner of Patents and Trademarks